US012158207B2

(12) United States Patent
Bond et al.

(10) Patent No.: US 12,158,207 B2
(45) Date of Patent: Dec. 3, 2024

(54) GASKET

(71) Applicant: Flexitallic Investments, Inc., Houston, TX (US)

(72) Inventors: Stephen Peter Bond, Houston, TX (US); Yi Li, League City, TX (US)

(73) Assignee: Flexitallic Investments, Inc., Houston, TX (US)

( * ) Notice: Subject to any disclaimer, the term of this patent is extended or adjusted under 35 U.S.C. 154(b) by 0 days.

(21) Appl. No.: 17/912,475

(22) PCT Filed: Mar. 18, 2021

(86) PCT No.: PCT/US2021/023044

§ 371 (c)(1),
(2) Date: Sep. 16, 2022

(87) PCT Pub. No.: WO2021/188842

PCT Pub. Date: Sep. 23, 2021

(65) Prior Publication Data

US 2023/0167902 A1 Jun. 1, 2023

(30) Foreign Application Priority Data

Mar. 19, 2020 (GB) ..................................... 2003996

(51) Int. Cl.
*F16J 15/10* (2006.01)
*F16L 17/067* (2006.01)

(52) U.S. Cl.
CPC ........... *F16J 15/102* (2013.01); *F16J 15/104* (2013.01); *F16J 15/108* (2013.01); *F16L 17/067* (2013.01)

(58) Field of Classification Search
CPC ........ F16J 15/102; F16J 15/104; F16J 15/108; F16L 17/067
See application file for complete search history.

(56) References Cited

U.S. PATENT DOCUMENTS 2,269,486 A 1/1942 Santoro
3,717,351 A 2/1973 Liebig
(Continued)

FOREIGN PATENT DOCUMENTS

CN 201351730 Y 11/2009
CN 203743426 U 7/2014
(Continued)

OTHER PUBLICATIONS

GB Application No. GB2003996.2, "Search Report", Aug. 21, 2020, 2 pages.

(Continued)

*Primary Examiner* — Gilbert Y Lee
(74) *Attorney, Agent, or Firm* — Kilpatrick Townsend & Stockton LLP

(57) ABSTRACT

There is provided a gasket (100) for sealing two mating surfaces, the gasket comprising: a rigid non-metal core (102) defining an aperture (104), the core comprising a first face (106) extending away from the aperture and a second face (122) opposite the first face; and at least one sealing layer (108); wherein the first face comprises: a substantially flat inner region (112) defining a plane; and a serrated region (110) comprising a plurality of serrations (118) that extend substantially perpendicular to the plane, wherein the substantially flat inner region is located between the aperture and the serrated region, wherein the serrations are recessed in the first face such that they do not cross the plane, wherein the at least one sealing layer overlays at least part of the serrated region of the first face.

20 Claims, 9 Drawing Sheets

102
120 112
124
110
118
106
114
122

(56) References Cited

U.S. PATENT DOCUMENTS

| | | | | |
|---|---|---|---|---|
| 3,720,420 | A | 3/1973 | Jelinek et al. | |
| 3,871,668 | A | 3/1975 | Coker et al. | |
| 5,511,797 | A | 4/1996 | Nikirk et al. | |
| 2005/0121859 | A1 * | 6/2005 | Seidel | F16J 15/0881 277/628 |
| 2006/0220324 | A1 | 10/2006 | Anderson et al. | |
| 2011/0115170 | A1 | 5/2011 | Krejci | |
| 2013/0249171 | A1 * | 9/2013 | Kolb | F16L 23/18 277/608 |
| 2013/0328270 | A1 | 12/2013 | Stubblefield et al. | |
| 2015/0060352 | A1 * | 3/2015 | Yoder | F16J 15/064 277/627 |
| 2016/0040783 | A1 | 2/2016 | Kullen | |
| 2016/0138172 | A1 * | 5/2016 | Al-Buraiki | F16L 23/18 204/196.15 |
| 2016/0138718 | A1 | 5/2016 | Lee et al. | |
| 2017/0074437 | A1 | 3/2017 | Briggs | |
| 2017/0152973 | A1 | 6/2017 | Kristopher et al. | |
| 2018/0328491 | A1 | 11/2018 | Taylor | |
| 2019/0234516 | A1 * | 8/2019 | Lee | F16L 17/06 |
| 2021/0003218 | A1 | 1/2021 | Lee | |

FOREIGN PATENT DOCUMENTS

| | | | | |
|---|---|---|---|---|
| DE | 3643283 | A1 | 3/1988 | |
| DE | 19755318 | A1 | 7/1999 | |
| DE | 202005006698 | | 6/2005 | |
| DE | 102014002941 | A1 | 8/2014 | |
| DE | 102015016155 | A1 | 6/2017 | |
| EP | 0640782 | A1 | 3/1995 | |
| EP | 1670872 | B1 * | 9/2012 | C09K 3/1028 |
| EP | 2607753 | A1 | 6/2013 | |
| EP | 3051083 | A1 | 8/2016 | |
| EP | 3593976 | A1 | 1/2020 | |
| FR | 2639416 | A1 | 5/1990 | |
| GB | 2278651 | A * | 12/1994 | F16J 15/104 |
| GB | 2546958 | A | 8/2017 | |
| JP | 2004308761 | A | 11/2004 | |
| WO | 2011077148 | A1 | 6/2011 | |
| WO | WO-2015064824 | A1 * | 5/2015 | F16J 15/06 |
| WO | 2020044058 | A1 | 3/2020 | |
| WO | WO-2020195434 | A1 * | 10/2020 | |
| WO | 2021188842 | A1 | 9/2021 | |

OTHER PUBLICATIONS

U.S. Appl. No. 17/272,284, “Final Office Action”, Dec. 22, 2022, 11 pages.

PCT/US2021/023044, “International Preliminary Report on Patentability”, Sep. 29, 2022, 8 pages.

U.S. Appl. No. 17/272,284, “Non-Final Office Action”, May 25, 2022, 11 pages.

International Application No. PCT/GB2019/052432 , “International Preliminary Report on Patentability”, Mar. 11, 2021, 10 pages.

International Application No. PCT/GB2019/052432 , “International Search Report and Written Opinion”, Nov. 11, 2019, 14 pages.

International Application No. PCT/US2021/023044 , “International Search Report and Written Opinion”, Jun. 23, 2021, 12 pages.

Related U.S. Appl. No. 17/272,284, “Final Office Action”, Jul. 20, 2023, 11 pages.

Shigley et al., “Mechanical Engineering Design”, McGraw-Hill Higher Education, 1989, 3 pages.

Related JP Application No. 2021-510917, “Notification of Reasons for Rejection”, Oct. 10, 2023, pp. 1-5.

* cited by examiner

GASKET

CROSS-REFERENCE TO RELATED APPLICATIONS

This application is the U.S. national phase of International Application No. PCT/US2021/023044 filed on Mar. 18, 2021, and published on Sep. 23, 2021 as International Publication No. WO 2021/188842 A1, which application claims priority to and the benefit of British Application No. 2003996.2, filed on Mar. 19, 2020, the contents of all which are incorporated herein by reference in their entireties.

The present invention relates to a gasket for sealing two mating surfaces and a method of producing a gasket.

More particularly, the present invention relates to a gasket comprising a non-metal core comprising a serrated portion for sealing two mating surfaces and a method of producing a gasket comprising a non-metal core comprising a serrated portion.

BACKGROUND

The use of gaskets in sealing applications is commonplace in many industries. A well-known application for gaskets is to provide fluid sealing between two mating surfaces such as between two ends of adjoining pipes or conduits where they are commonly in the form of a flange joint for ease of assembly and disassembly and for better sealing.

A flange joint sealing gasket usually comprises a compressible ring defining an aperture of a size that matches the conduit being sealed and a body that matches the dimensions of the flange mating surfaces.

In high pressure sealing applications, one preferred gasket is known as a Kammprofile gasket. This is effectively a gasket with a series of concentric serrations or a concertina-like profile on one or both facing surfaces. The profile is superimposed onto a solid core, usually metal, by the series of concentric serrations. During the sealing process the overlying softer sealing material of the compressible ring (commonly called the facing) is forced into the gaps between serrations to improve sealing by inducing stress concentrations on the sealing surfaces and sealing micro-imperfections on the flanges. The serrations also minimise lateral movement of the sealing material of the facing, while the core provides rigidity and blowout resistance. Such a profile gives the gasket added strength for high pressure applications.

The facings in gaskets are required to be compressible, to provide a good seal, and to be resistant to creep.

However, a problem associated with these kammprofile gaskets is that they are made of metal and consequently are not effective isolators as they are electrically conductive.

Further, for metal gaskets comprising serrations, the serrations are arranged such that the peaks of the serrations are clearly above the height of any inner or outer region and can lead to piercing of the facing.

Non-metal isolating gaskets are known. These are typically a glass reinforced epoxy (GRE) core and a rubber bead (occasionally PTFE bead). However, the bead has some limitations, especially due to the compression set of the rubber (or the cold flow of the PTFE)—this can lead to sealing issues long term. The rubber may also have temperature limitations (both high temp (decomposition) and low temp (Tg)). Also the geometry forces a thin (⅛th inch) wide bead which can lead to issues such as when there is a flange defect or blemish. If the seal is on this defect it may not seal effectively.

A wider rubber seal might not be ideal as O ring type seals work best in a constrained groove with as little of the O ring as possible protruding from the groove when it is in service.

The present inventors seek to provide a gasket comprising serrations in which some or all of the disadvantages of existing gaskets are overcome.

SUMMARY

According to a first aspect there is provided a gasket for sealing two mating surfaces, the gasket comprising: a rigid non-metal core defining an aperture, the core comprising a first face extending away from the aperture and a second face opposite the first face; and at least one sealing layer; wherein the first face comprises: a substantially flat inner region defining a plane; and a serrated region comprising a plurality of serrations, wherein the substantially flat inner region is located between the aperture and the serrated region, wherein the serrations are recessed in the first face such that they do not cross the plane, wherein the at least one sealing layer overlays at least part of the serrated region of the first face. In one example, the plurality of serrations comprise peaks and troughs and the peaks of the serrations do not cross the plane.

The gasket provides a rigid non-metal core with a rigid flat inner region arranged to contact a mating surface in use. The non-metal core may be composed of a material which resists compression. The sealing layer is arranged to overlay the serrations so that the sealing layer is compressible into the serrations in use so that a better seal is provided between the gasket and the mating surfaces. The recessed serrations are arranged within the core to minimise or prevent contact with the mating surfaces in use. The flat inner region provides a load bearing surface during contact with the mating surface. The flat inner region also minimises or prevents contact of the serrations with the mating surface in use.

The serrated region of the non-metal core may be machine formed. Machine forming is defined as removing material with the aid of a machine tool. The formed serrations may have a textured/rough surface. The textured/rough surface may provide more efficient sealing when the sealing layer is compressed into the serrations.

The serrations may extend substantially perpendicular to the plane.

The non-metal core may be formed of a single piece. The single piece may be more easily formed, for example by machining, than a core composed of two or more parts. A core formed of a single piece may be structural more resilient than other cores.

The first face may comprise a substantially flat outer region that is typically aligned on the plane with the inner region. The flat inner and outer regions cooperatively provide a load bearing surface to help minimise or prevent contact of the serrations with the mating surfaces.

The flat inner and outer regions also help to spread compression pressure over a greater surface area. This helps with sealing and preservation of the integrity of the whole of gasket.

The flat inner and outer regions may be located on opposing sides of the serrated region. The flat inner and outer regions may be located immediately adjacent the serrated region.

The serrations may terminate prior to the plane to define a channel in the first face of the core. This helps to minimise or prevent contact of the serrations with the mating surface.

In one example, the peaks of the serrations may terminate prior to the plane to define a channel in the first face of the core.

The channel may extend radially around the aperture. The channel may be an annular channel. in one example, the channel extends in a circumferential direction spaced from the periphery of the aperture or the like.

The at least one sealing layer may be at least partially located within the channel defined by the serrated region. This helps secure the sealing layer to the core. Positioning the at least one sealing layer in the channel also helps to minimise or prevent lateral movement of the sealing layer.

The channel or channel base may be substantially sloped relative to the plane defined by the flat inner region. This may increase the internal pressure as the sealing layer is pushed outwards to provide a more efficient seal between the sealing layer and serrated region. In one example, the channel is substantially sloped away from the aperture. Preferably, the channel has a relatively larger depth adjacent to the inner region compared with the depth of the channel adjacent to the outer region. In other words, the channel may decrease in depth outward from the inner region to the outer region. The sloped arrangement could help with energizing the seal, i.e., the internal pressure forces the structure to seal better. The sloping away from the aperture, in theory, allows the gasket to be "self-energized" as the pressure pushes the sealing layer outward, into shallower serration and therefore increase in density. The internal pressure can work on the seal to improve the seal performance overall as it is pushed outwards.

The serrations may be configured to extend to the plane defined by the inner region. The sealing layer does not therefore have to be of any particular shape because it is not required to fit into a channel.

The serrated region may comprise at least one bridge that is located between at least one pair of adjacent serrations. The bridge may comprise an engagement surface for the at least one sealing layer. The engagement surface may provide a load bearing surface to help reduces stress on the serrations that may reduce the effectiveness of the seal.

The at least one bridge may comprise a planar portion. The planar surface may provide a load bearing surface to help reduce stress on the serrations that may reduce the effectiveness of the seal. The planar surface and flat inner/outer regions may cooperatively provide a load bearing surface to help minimise or prevent contact of the serrations with the mating surfaces.

The at least one non-serrated planar portion may be offset with respect to the plane defined by the inner region.

At least one of the bridges may be arranged centrally with respect to distance from the aperture within the serrated region. This may provide a load bearing surface centrally within the serrated region to minimise the amount of compressive pressure applied to the serrations. The centrally located bridge may also help minimise or prevent contact of the serrations with the mating surfaces.

At least one of the bridges may be located non-centrally in the serrated region. This may provide non-central load bearing surfaces so that less compressible pressure is applied to the central serrated region.

At least two of the bridges may be located symmetrically about the centre of the serrated region. This arrangement provides symmetrical load bearing surfaces so that compressive pressure is evenly applied. Alternatively, the bridges may be located asymmetrically about the centre of the serrated region. That is to say that there may be a plurality of bridges that are not arranged symmetrically about the centre of the serrated region. For example, there may be two bridges located to one side of the centre of the serrated region.

In one example, one bridge may be located on one side of the serrated region and at least two bridges may be located on the other side of the serrated region. Put another way there may be more bridges located on one side of the serrated region than on the other side of the serrated region.

In one example, the core includes an asymmetric arrangement of bridges in the first face and the second face. That is to say that the serrated region in the first face may have a first number of bridges and the serrated region in the second face comprises a second number of bridges.

The plurality of serrations may comprise a first set of serrations and a second set of serrations, wherein the first set of serrations are larger than the second set of serrations. The larger first set of serrations may inhibit or slow gas permeation through the core of the gasket.

The at least one sealing layer may comprise one or more projections configured to be coupled with at least one of the first set of serrations. The projections when coupled with the first set of serrations may provide more effective sealing during compression of the gasket and the mating surfaces.

The non-metal core may be formed of or comprise glass reinforced epoxy, a phenolic resin, polytetrafluoroethylene, polyimide, an (alk)acrylic (co)polymer or other suitable (co)polymer.

The at least one sealing layer may be formed of or comprises polytetrafluoroethylene, layered silicates, a ceramic or graphite, more typically, graphite or vermiculite (including exfoliated vermiculite, biotite, hydrobiotite and phlogopite).

In one example, the core has a through thickness of between approximately 1 mm to 8 mm.

In one example the at least one sealing layer comprises one or more exfoliated graphite, polytetrafluoroethylene (PTFE), or of a layered silicate material such as mica or exfoliated vermiculite. Preferred materials for the sealing layer are inorganic materials, including layered silicates, ceramics and graphite. Especially preferred materials for the sealing layer include layered silicates and graphite. The term layered silicate in this specification includes micas and vermiculites. Mixtures of such materials could be employed. It should be noted that the term vermiculite in this specification includes materials that may sometimes be called biotite, hydrobiotite and phlogopite (nomenclature in this area being contentious). Micas are useful in the present invention for their good dielectric properties.

Preferred vermiculite for use in the present invention is or comprises exfoliated vermiculite, which may be chemically exfoliated vermiculite (CEV), or thermally exfoliated vermiculite (TEV), or a mixture of CEV and TEV. It may be mixed with other minerals. Thus, other preferred materials include exfoliated vermiculite (which may comprise CEV, or TEV, or a mixture of CEV and TEV), in admixture with other minerals, for example one or more of talc, mica and graphite.

Especially preferred materials for the sealing layer include exfoliated vermiculite, preferably, chemically exfoliated vermiculite and exfoliated graphite; in the case of vermiculites optionally admixed with further mineral materials.

Such materials are compressible, and on assembly and installation of the gasket are typically compressed by from 40% to 80% of the original thickness. Compression is accompanied by the filling of the troughs of the serrations and by the spreading of the sealing layer.

As was noted above exfoliated graphite and exfoliated vermiculite have many excellent properties for use in the facing of a gasket, notably excellent mechanical properties, high thermal resistance and very good chemical resistance.

The sealing layer may have a thickness of approximately 0.1 mm to 1.25 mm. The at least one sealing layer may be made of a compressible material, and may preferably be in particulate, sheet or fibrous form. In use, when the gasket is located between opposed surfaces of pipes or conduits under a compressive load, the sealing layer is compressed. Typically, the compression of the sealing layer in use is within the range 30-90% compression in use ((initial-final)/initial thickness×100), more typically, 40-80%, most typically, between 50-70% compression. In any case, the sealing layer will typically have more than 30% compression, more typically, more than 40% compression and most typically more than 50% compression in use. A suitable compression test is ASTM F36-15 carried out at room temperature—25° C.

Suitably the mean thickness of the sealing layer when uncompressed, prior to use, is at least 0.2 mm, preferably at least 0.4 mm, preferably at least 0.5 mm, in some embodiments at least 0.6 mm, and in other embodiments at least 0.7 mm. Suitably the mean thickness of the sealing layer when uncompressed, prior to use, is up to 4 mm, preferably up to 2 mm, and most preferably up to 1 mm.

In one example, the at least one sealing layer is configured to extend to abut at least a portion of the inner region. Therefore, the at least one sealing layer may be configured to extend past the serrated region to abut or overlay at least a portion of the inner region, typically, to extend beyond the serrated region to abut or overlay both a portion of the inner and outer region. In use, the portion of the at least one sealing layer that abuts or overlays the inner region, and, optionally, the outer region, has a relatively higher density compared with the remainder of the sealing layer.

In one example, the density of the at least one sealing layer in an uncompressed state may be between 0.8 to 1.6 g/cc, typically between 1.2 to 1.3 g/cc.

The density of the at least one sealing layer may be between 1.4 to 2.2 g/cc, typically between 1.6 to 1.9 g/cc in a compressed state, i.e. when compressed against the serrated portion.

The second face may comprise: a second substantially flat inner region defining a second plane; and a second serrated region comprising a second plurality of serrations wherein the second substantially flat inner region is located between the aperture and the second serrated region, wherein the second plurality of serrations are recessed in the second face such that they do not cross the second plane, wherein the at least one sealing layer overlays at least part of the second serrated region of the second face. In one example, the second plurality of serrations comprises peaks and troughs and the peaks of the serrations do not cross the second plane.

According to a second aspect of the invention there is provided a method of producing a gasket comprising the steps of: providing a rigid non-metal core defining an aperture, the core comprising a first face extending away from the aperture and a second face opposite the first face; and forming a serrated region comprising a plurality of serrations in the first face of the core such that the first face comprises: a substantially flat inner region defining a plane; and the serrated region comprising a plurality of serrations; wherein the substantially flat inner region is located between the aperture and the serrated region; and wherein the serrations are recessed in the first face such that they do not extend past the plane. In one example, the plurality of serrations comprises peaks and troughs and the peaks of the serrations do not cross the plane.

The serrated profile may be machine formed. Alternatively, the serrated profile may be formed by forging and/or moulding, for example injection moulding.

The method may further comprise the step of providing at least one sealing layer and overlaying the at least one sealing layer over at least part of the serrated region of the first face.

All of the features contained herein may be combined with any of the above aspects and in any combination.

BRIEF DESCRIPTION OF THE DRAWINGS

Examples of the present disclosure will now be described with reference to the accompanying drawings.

DETAILED DESCRIPTION

The present disclosure relates to a gasket for sealing two mating surfaces. In the examples presented below, the gasket is made of a non-metal core. This is contrary to the majority of gasket cores that are formed of metal and so a number of different challenges are encountered.

The non-metal core comprises a serrated region comprising a plurality of serrations. A sealing layer is configured to engage with the serrated region to provide a seal across the gasket. The non-metal core also includes a substantially flat inner region located between the serrated region and the aperture. The substantially flat inner region is located next to the aperture to separate the serrated region from the aperture of the gasket. This separation means that the materials of the sealing layer will be separated from any fluid that passes through the gasket and so there is a significantly reduced likelihood of any chemical reactions taking place between the sealing layer and fluid that passes through the gasket.

The serrated regions provide a good seal for the gasket. It has been found that limiting the extent of the serrations such that they are not proud of the rest of the core means that the serrations are not subject to excess stress, in use. This means that the serrations are less likely to deform and/or fracture, in use, which may result in a less effective seal.

Figure 1:
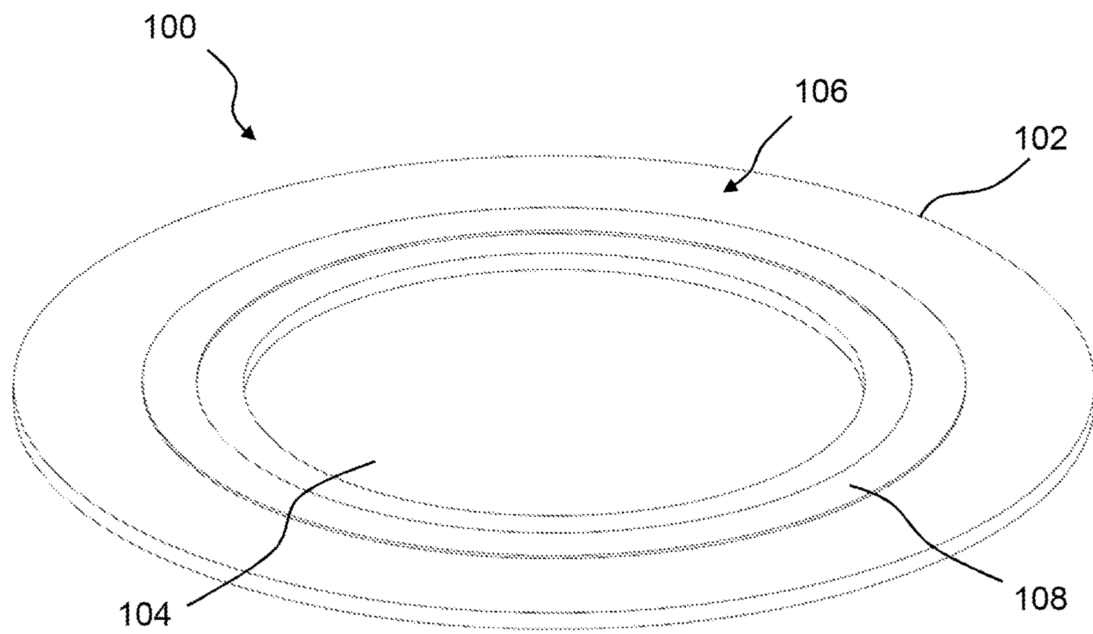
FIG. 1 shows a perspective view of an example of a gasket.

FIG. 1 shows an example of a gasket 100 according to one example. The gasket 100 comprises a non-metal core 102 that defines an aperture 104 therethrough. In use, a fluid may flow through the aperture 104.

The non-metal core has a first face 106 and a second face (not shown in FIG. 1). The first face 106 extends away from the aperture 104. In the example shown in FIG. 1, the first face is shown as being vertically above the second face, i.e. the gasket 100 is arranged in a vertical orientation, but in practice, the gasket 100 is suitable for use in any orientation, such as in a horizontal configuration where the first face 106 and the second face would be side by side. The second face (not shown) is opposite the first face 106.

In the example shown in FIG. 1, the aperture 104 is substantially circular, but apertures 104 of other shapes are envisaged. For example, the aperture may be polygonal shaped, oval shaped, rectangular shaped and/or square shaped. Other shapes are envisaged.

The gasket 100 also comprises at least one sealing layer 108. In the example shown in FIG. 1, the at least one sealing layer 108 is in the form of a ring that is coupled with the core 102. The at least one sealing layer 108 is designed to engage with serrations formed in the first face 102, which will be described in more detail in FIGS. 5A to 5E. In one example, the at least one sealing layer 108 is concentric with the aperture 104.

On assembly of the gasket 100, the at least one sealing layer 108 engages with the serrations of the serrated region 100. The at least one sealing layer 108 may be bonded to the serrated region 100 by a spray adhesive. The spray adhesive may be a contact adhesive, for example an acrylic contact adhesive. An example of an acrylic contact adhesive is 3M Super 77.

Figure 2:
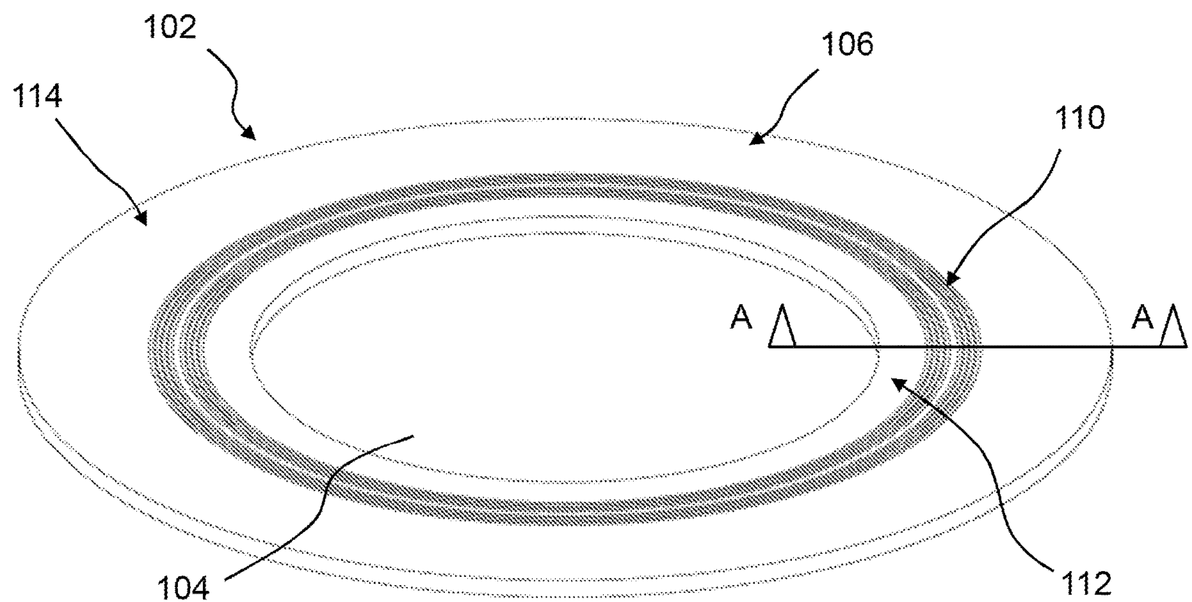
FIG. 2 shows a perspective view of an example of the gasket with the sealing layer removed.

FIG. 2 shows an example of a core 102 of a gasket 100. In FIG. 2, the sealing layer 108 has been removed from the gasket 100 for clarity. As shown in FIG. 2, the first face 106 may comprise a substantially flat inner region 112. This substantially flat inner region 112 defines a plane that extends along and beyond the inner region 112.

The first face 106 also comprises a serrated region 110 comprising a plurality of serrations. The profile of the serrations is shown in more detail in FIGS. 4A to 4E.

The substantially flat inner region 112 is located between the serrated region 110 and the aperture 104. That is to say that the substantially flat inner region 112 provides a separation between the aperture 104 and the serrated region 110. This is important because the sealing layer 108 is positioned away from the media, such as fluid, flowing through the pipe. This prevents build-up of media between the sealing layer 108 which may create a conduction path or corrosion zone. Also, providing a flat inner region may help prevent or mitigate turbulent flow, and issues that can arise from turbulent flow. The inner ring 112 spaces the sealing layer 108 away from the media flowing through the gasket 100. Also, having an inner ring 112 that extends to the aperture 104 is useful for avoiding turbulent flow (and issues that can arise from that) caused by there not being a smooth path for the fluid through the aperture 104.

The first face 106 may also include a substantially flat outer region 114 that is aligned on the plane with the inner region 112. In one example, the non-metal core 102 is substantially ring shaped. In this example, the inner region 112, the serrated region 110 and the outer region 114 may be configured to be concentric rings around a central aperture 104. In one example, the outer region 114 substantially surrounds the serrated region 110, which in turn, substantially surrounds the inner region 112, which in turn substantially surrounds the aperture 104.

The at least one sealing layer 108 overlays at least part of the serrated region 110 of the first face 106. In one example, the at least one sealing layer 108 overlays all of the serrated region 110 of the first face 106.

The second face, not visible in FIGS. 1 and 2, may be substantially identical to the first face 106 and have substantially identical features.

Figure 3:
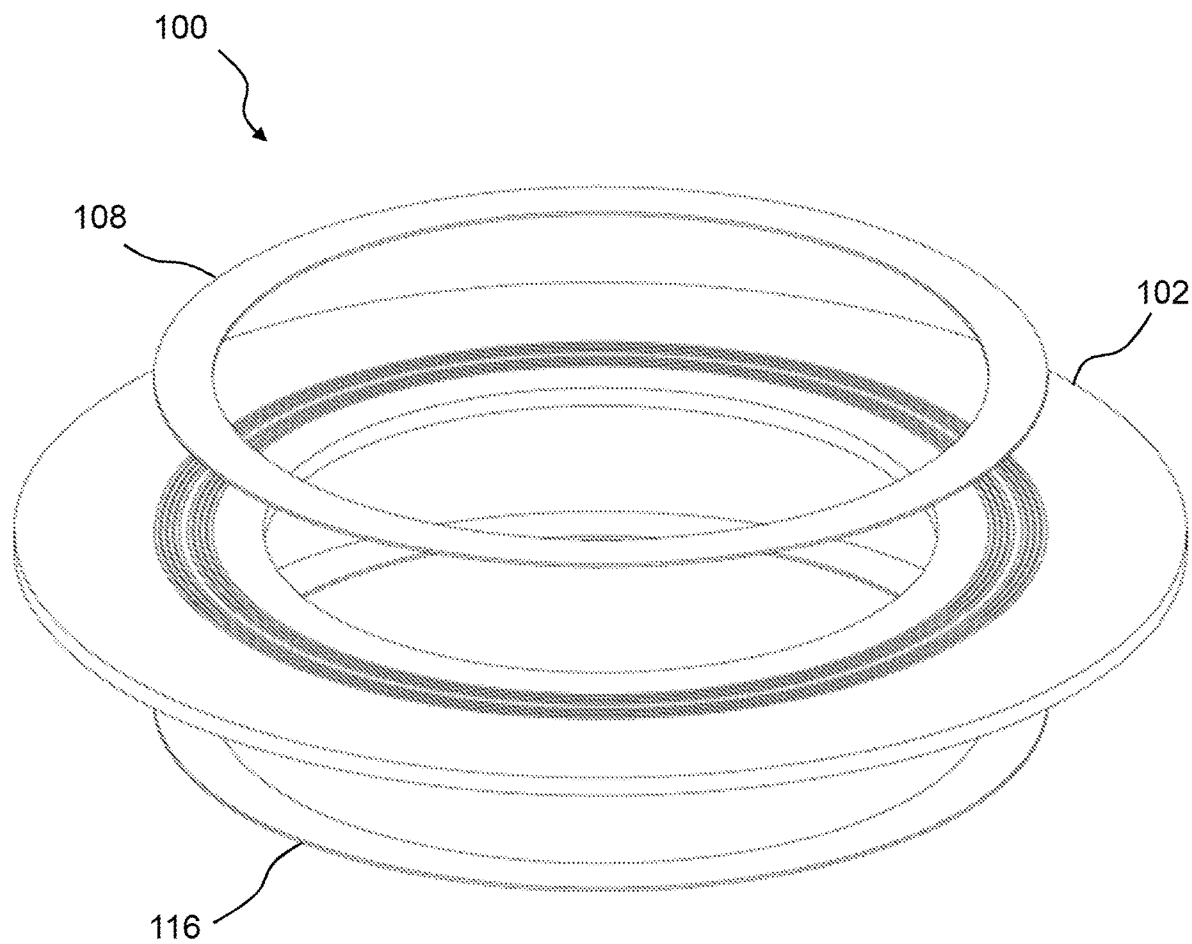
FIG. 3 shows an exploded view of an example of the gasket.

FIG. 3 shows an exploded view of an example of the gasket 100. In this example, there is a second sealing layer 116 that is coupled to the second side of the core 102. For example, the second sealing layer 116 overlays at least part of the serrated region of the second face.

FIGS. 4A to 4E show examples of a cross-sectional view through the core 102, as shown by section markers A-A in FIG. 2. FIGS. 4A to 4E show different profiles of serrations of the serrated region 110 of the first face 106. In the examples shown in FIGS. 4A to 4E, the at least one sealing layer 108 is not shown for clarity.

The serrated region 110 comprises a plurality of serrations 118. A core 102 comprising serrations 118 is known as a Kammprofile core. The serrations 118 of the serrated region 110 may be a series of concentric serrations or a concertina-like profile on the first face 106. The profile is superimposed onto a core 102 by the series of concentric serrations.

During the sealing process the overlying sealing layer 108 is forced into the gaps between serrations 118 to improve sealing by inducing stress concentrations on the sealing surfaces.

The serrations 118 also minimise lateral movement of the sealing layer 108, while the core 102 provides rigidity and blowout resistance. Such a profile gives the gasket 100 added strength for high pressure applications.

The serrations 118 can be considered to be a series of peaks and toughs. In one example, the serrations are substantially saw-toothed or sinusoidal. In one example, the serrations 118 have an amplitude of approximately 0.1 mm to 0.6 mm.

In one example, the serrations 118 hold the at least one sealing layer 108 in place when the internal pressure is applied, and to prevent what is known as Blow-Out.

Surprisingly, it was possible to machine non-metal cores 102, such as glass fiber filled epoxy resin sheets with the level of precision required to form these serrations 118 to enable an effective seal to be formed in the gasket 100. Ordinarily one might expect ragged bits of glass fiber and epoxy to be a problem, but this is not the case.

Figure 4A:
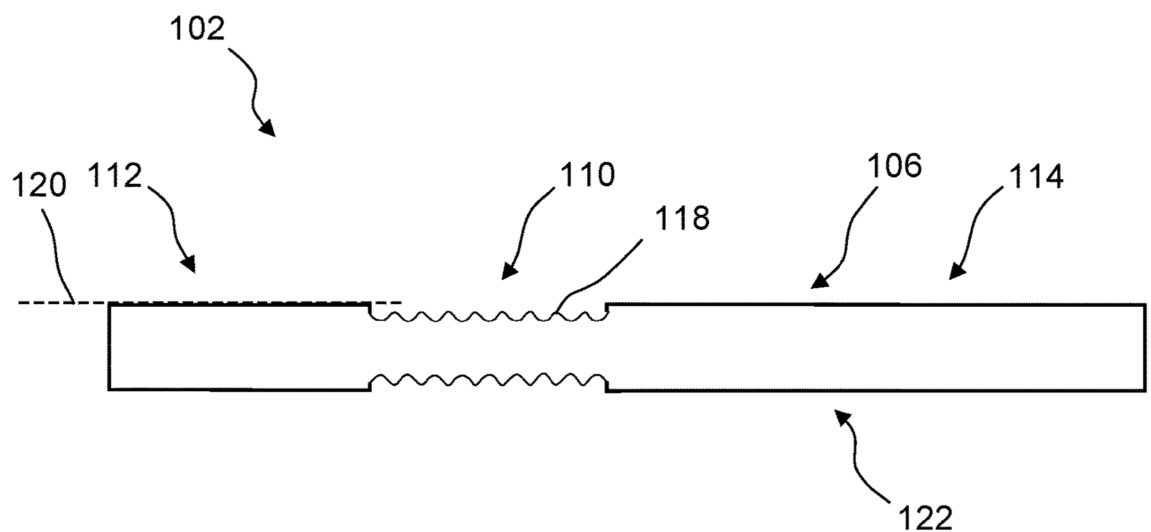
FIGS. 4A to 4E show examples of a cross-sectional view through the core with the sealing layer removed.

As shown in FIG. 4A, the substantially flat inner region 112 defines a plane 120. The plane 120 extends beyond the end of the inner region 112. The serrations 118 extend in a direction that is substantially perpendicular to the plane 120.

In the example shown in FIG. 4A, the serrations 118 are recessed in the first face 106 such that they do not cross the plane 120 defined by the substantially flat inner region 112. In other words, the serrations 118 are recessed in the first face 106 such that all of the serrations 118 are located to one side of the plane 120. Put another way, the serrations 118 terminate prior to the plane 120 and do not cross the plane 120.

Cutting the serrations 118 below the plane 120 of the inner region 112 of the core 102 means that the serrations 118 are protected from the direct effect of the load and are only loaded though the compression of the at least one sealing layer 108. Furthermore, as the sides of the serrations 118 are not smooth like in a metal, the uneven surface may be contributing to the sealing ability.

In FIG. 4A, the serrated region 110 is located in a channel within the first face 106. That is to say that the through thickness of the core 102 in the serrated region 110 is less than the through thickness of the core 102 in a non-serrated region, such as the inner region 112 or the outer region 114.

In one example, the channel is recessed into the first layer 106 by approximately 0.1 mm to 0.4 mm. That is to say that the top of the serrations may be offset from the plane 120 defined by the inner region 112 by approximately 0.1 mm to 0.4 mm.

As the serrations 118 are recessed from the first face 106 of the core 102, they will not be subject to substantially high amounts of pressure due to the mating of the two surfaces. Rather, more pressure may be exerted on the non-serrated portions, for example, the inner region 112 and the outer region 114. This protects the serrated region 110 from becoming deformed and the serrations are able to provide an effective seal, together with the at least one sealing layer 108. In one example, at least one sealing layer 108 is at least partially located within the channel defined by the serrated region 110. The at least one sealing layer 108 is not shown in FIG. 4A for clarity. The at least one sealing layer 108 may be positioned entirely over or at least partially over the inner region 112 and/or the outer region 114. Thus, more pressure will be exerted on the sealing layer covering the inner region 112 and/or the outer region 114. This protects the serrated region 110 from becoming deformed and the serrations 118 are able to provide an effective seal, together with the at least one sealing layer 108 which is pressed into the serrations by the compressive forces.

FIG. 4A shows the second face 122. The second face 122 may comprise a second set of all of the elements of the first face 106, i.e. a second inner region that defines a second plane, a second serrated region and a second substantially flat outer region.

In FIG. 4A, the serrations 118 are substantially similar in size and shape. In other words, the serrations have approximately the same distance between peaks and troughs.

In FIG. 4A, the outer region 114 is located on the plane 120 defined by the inner region 112. In other words, the outer region 114 is located at substantially the same level as the inner region 112.

Figure 4B:
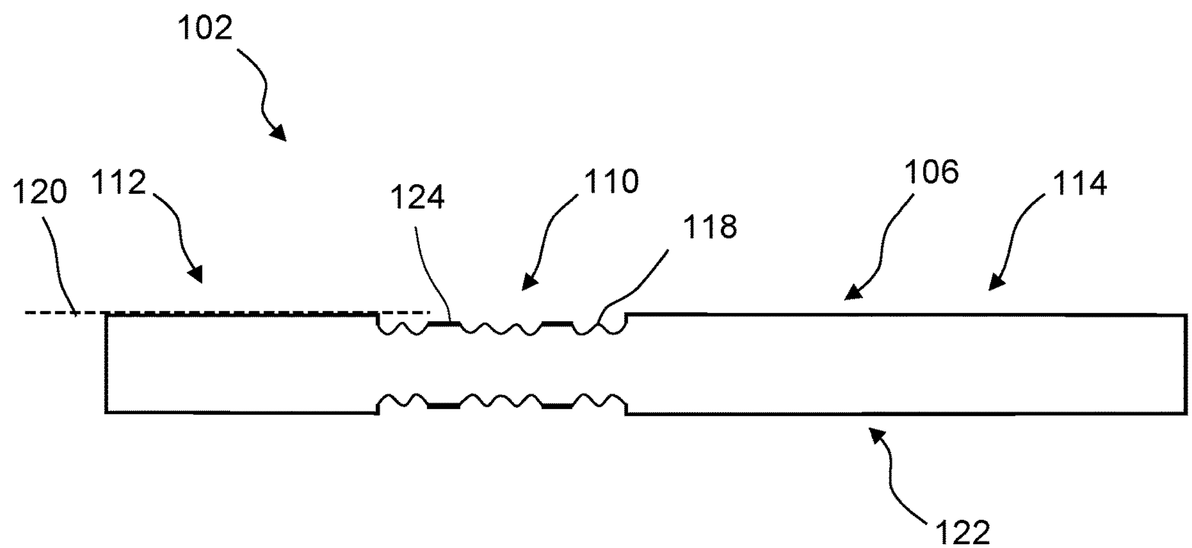

FIG. 4B shows another example of a cross-sectional view through the core 102, as shown by section markers A-A in FIG. 2.

The example shown in FIG. 4B is substantially identical to the example shown in FIG. 4A except that the serrated region 110 comprises one or more non-serrated regions or bridges 124 that are located between at least one pair adjacent serrations 118. The bridge 124 may be considered to be a link between adjacent serrations 118 that extends the spacing between the adjacent serrations 118. In one example, the bridge 124 comprises a substantially flat regions or a planar portion.

In use, the bridge 124 will be subjected to a higher stress concentration compared with the serrations 118 such that the serrations 118 are less likely to be significantly deformed, in use. This means that the serrations 118 are more likely to stay engaged with the at least one sealing layer 108 to form a seal. The bridges 124 help with load distribution which helps sealing and will help preserve the integrity of the gasket 100 as a whole.

In one example, the planar portion of the bridge 124 is offset with respect to the plane 120 defined by the inner region 112. The extent of the serrations 118 is configured to terminate at the same level as the non-serrated region 124. In other words, the serrated region 110 defines a channel in the first face 106 of the core 102.

In one example, at least one of the bridges 124 is located centrally within the serrated region 110.

In another example, at least one of the bridges 124 is located offset relative to the centre of the serrated region 110, for example, at least two of the bridges 124 may be located symmetrically offset relative to the centre of the serrated region 110.

Figure 4C:
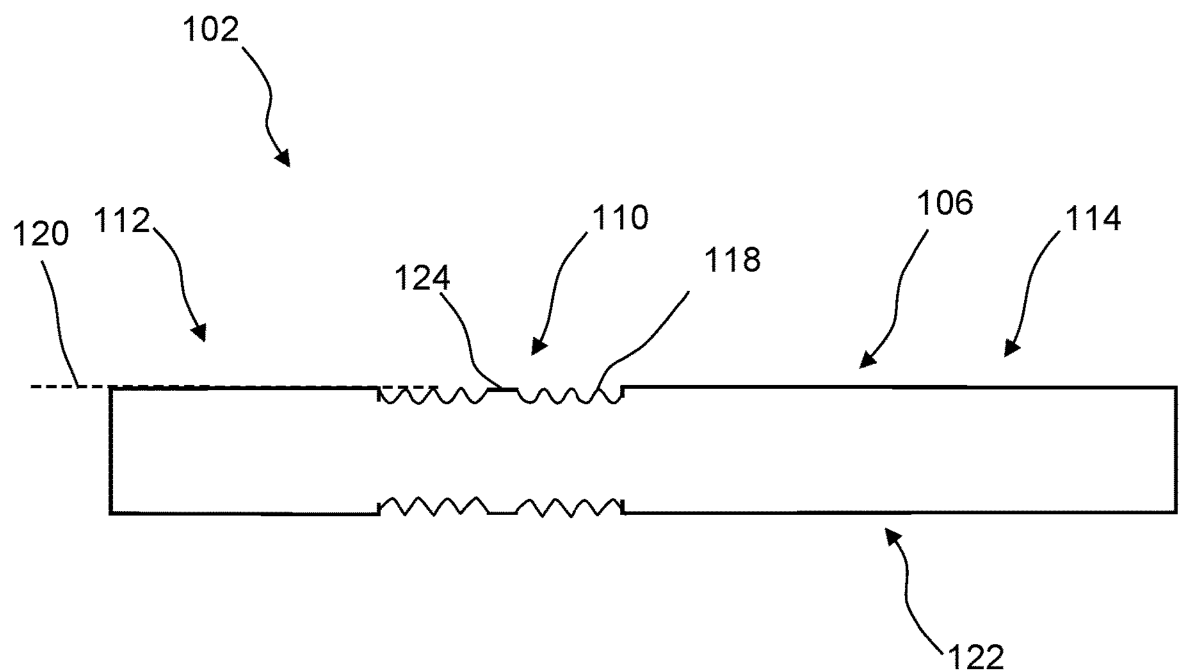

FIG. 4C shows another example of a cross-sectional view through the core 102, as shown by section markers A-A in FIG. 2.

The example shown in FIG. 4C is substantially identical to the example shown in FIG. 4B except that the planar region of the bridge 124 is substantially aligned with the plane 120 of the inner region. In this example, the extent of the serrations 118 is also aligned with the level of the planar region of the bridge 124.

//FIG. 4D

Figure 4D:
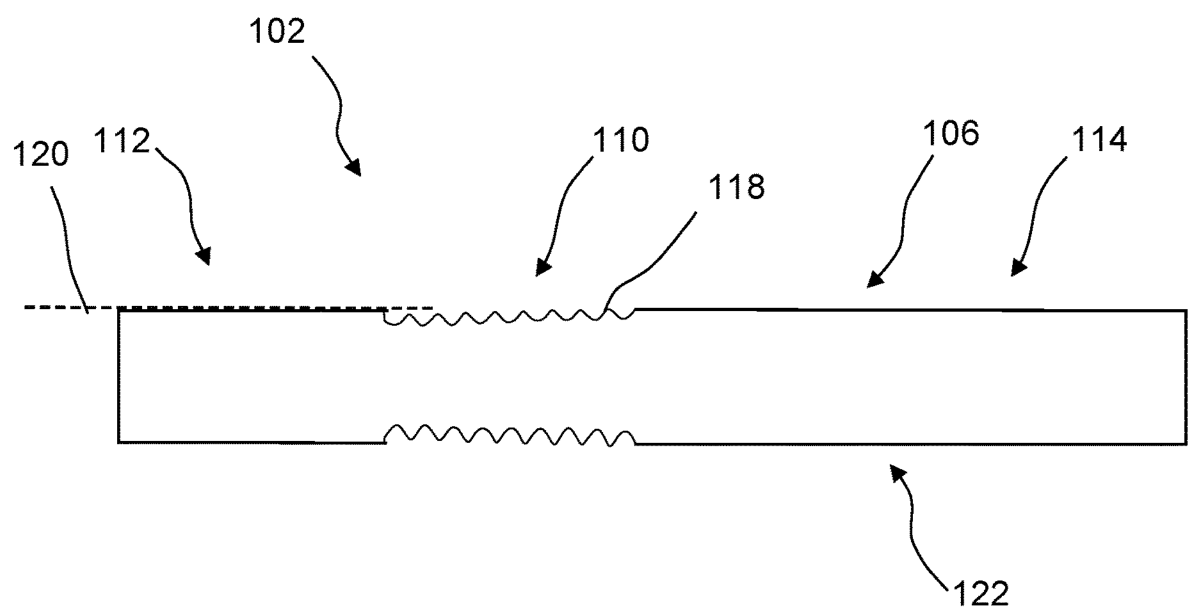

FIG. 4D shows another example of a cross-sectional view through the core 102, as shown by section markers A-A in FIG. 2.

The example shown in FIG. 4D is substantially identical to the example shown in FIG. 4A except that the serrated region 102 is substantially sloped relative to the plane 120 defined by the flat inner region 112. This may increase the internal pressure as the sealing layer is pushed outwards to provide a more efficient seal between the sealing layer and serrated region. The internal pressure can work on the seal to improve the seal performance overall as it is pushed outwards.

In one example, the serrated region 102 is sloped from the inner region 112 to the outer region 114. That is to say that the through thickness of the serrated region 102 is smaller adjacent to the inner region 112 compared with the through thickness of the serrated region 102 adjacent to the outer region 114. This may increase the internal pressure as the sealing layer is pushed outwards to provide a more efficient seal between the sealing layer and serrated region. In one example, the channel is substantially sloped away from the aperture. That is to say that the depth of the channel is relatively thicker adjacent to the inner region compared with the depth of the channel adjacent to the outer region. In other words, the channel may slope outward from the inner region to the outer region. The sloped arrangement could help with energizing the seal, i.e., the internal pressure forces the structure to seal better. The sloping away from the aperture, in theory, allows the gasket to be "self-energized" as the pressure pushes the sealing layer outward, into shallower serration and therefore increase in density FIG. 4E shows another example of a cross-sectional view through the core 102, as shown by section markers A-A in FIG. 2.

Figure 4E:
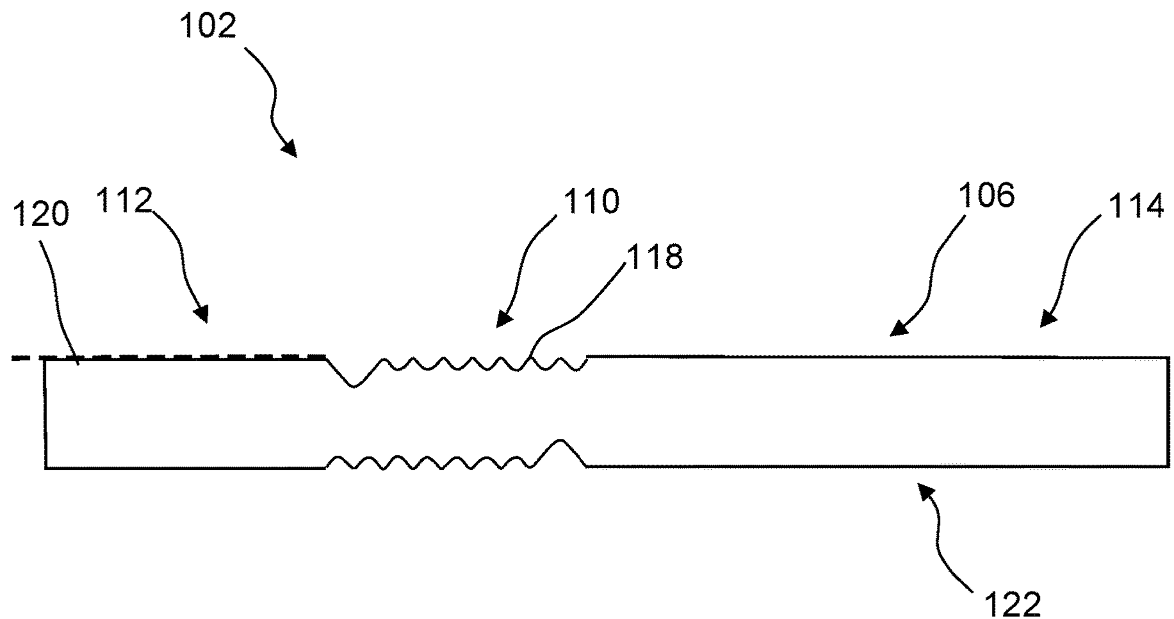

The example shown in FIG. 4E is substantially identical to the example shown in FIG. 4C except that the plurality of serrations 118 comprises a first set of serrations and a second set of serrations. The first set of serrations are larger than the second set of serrations. In FIG. 4E, one of the serrations comprises a deeper trough compared with the other serrations. In one example, the at least one sealing layer comprises one or more projections configured to be coupled with at least one of the first set of serrations.

Each of the examples of FIGS. 4A to 4E also show a second face 122. The second face 122 may comprise a second set of all of the elements of the first face 106, i.e. a second inner region that defines a second plane, a second serrated region and a second substantially flat outer region and the various elements of each of the embodiments in FIGS. 4A to 4E. There may be a second sealing layer 116 that is configured to cover or overlay at least part of the serrated region of the second face.

FIGS. 5A to 5E show examples of cross-sectional view through the core 102, as shown by section markers A-A in FIG. 2, but with a first sealing layer 108 overlaying the serrated region 110 of the first face 106 and a second sealing layer 116 overlaying the serrated region of the second face 122. In each of the examples shown in FIGS. 5A to 5E, the at least one sealing layer 108 is substantially unstressed. In use, the sealing layer 108 would be pressed into the serrations so as to form a seal in the gasket 100.

Generally, the at least one sealing later 108 overlays at least part of the serrated region 110 of the first face 106. In one example, the at least one sealing later 108 overlays substantially all of the serrated region 110 of the first face 106.

In one example, the at least one sealing layer 108 extends past the serrated region 110 such that is abuts at least part of the inner region 112. In one example, the at least one sealing layer 108 extends past the serrated region 110 such that is abuts at least part of the outer region 114. In the examples where the at least one sealing layer 108 abuts at least part of the inner region 112 and/or outer region 114, the abutting area of the inner region 112 and/or outer region 114 provides an important role in both bearing the load and also densifying the sealing layer 108 to higher than usual levels such that it provides a surprisingly good level of sealing. It will be understood that densifying means compressing the sealing layer 108 so that it becomes more dense, relative to the sealing layer in its uncompressed state.

In the examples in which the serrated region 110 comprises one or more bridges 124, under loading the sealing layer 108 is densified in the regions where it abuts the one or more bridges 124. This process of densifying provides a good seal between the sealing layer 108 and the serrated region 110.

In one example, the regions of the inner region 112 and/or the outer region 114 on which the at least one sealing layer 108 is abutted may be formed of a material comprising a higher density compared with the rest of the inner region 112 and/or outer region 114. In other words, the portions of the inner region 112 and/or the outer region 114 that are adjacent to the serrated region 110 comprises a higher density material compared with the remaining regions of the inner region 112 and/or outer region 114.

Figure 5A:
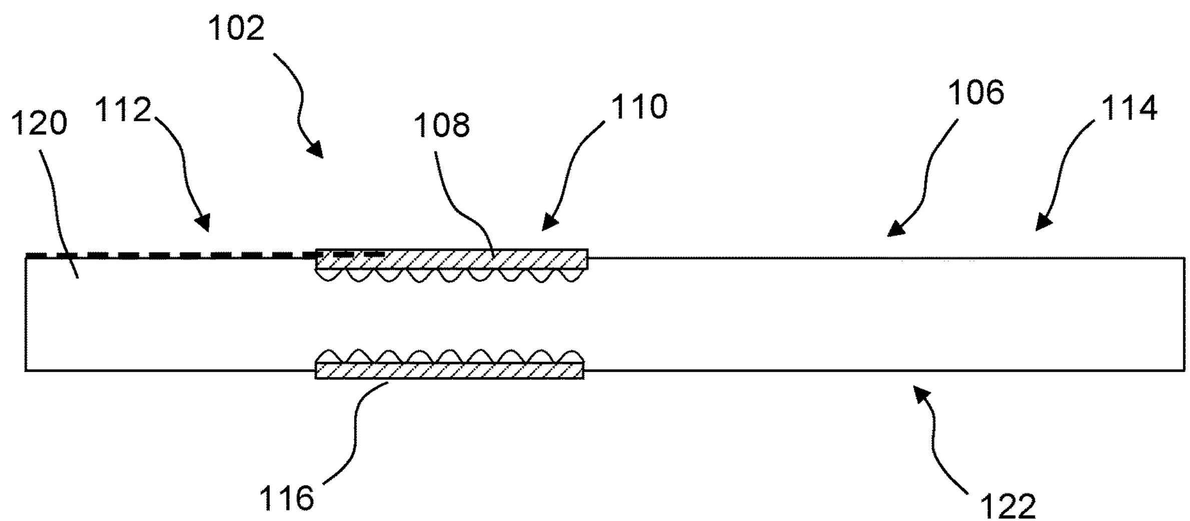
FIGS. 5A to 5E show examples of a cross-sectional view through the core.

FIG. 5A corresponds to the cross section shown in FIG. 4A, but with the at least one sealing layer 108 shown as overlaying at least part of the serrated region 110.

In the example shown in FIG. 5A, the sealing layer 108 abuts the serrations 118, in use. Further, at least part of the sealing layer 108 is located within the channel defined by the serrated region 110.

FIG. 5A shows a second sealing layer 116 located in the channel defined by the serrated region 110 in the second face 122 of the core 102.

Figure 5B:
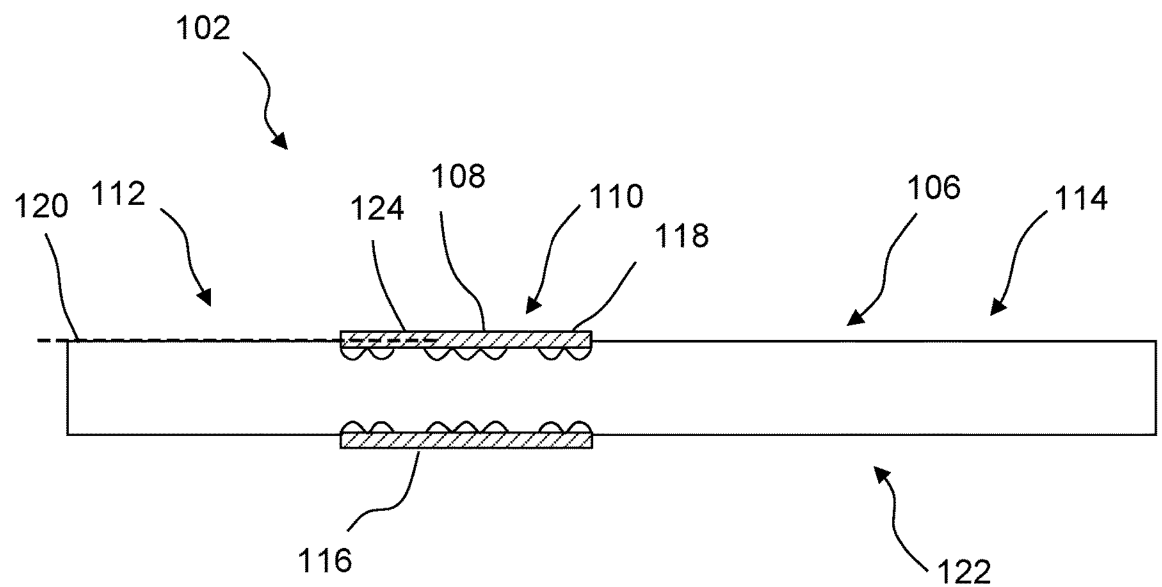

FIG. 5B corresponds to the cross section shown in FIG. 4B, but with the at least one sealing layer 108 shown as overlaying at least part of the serrated region 110. As shown in FIG. 5B, the at least one sealing layer 108 abuts the bridge 124 in between adjacent serrations 118 and also abuts the serrations 118. The bridge 124 may provide support for the sealing layer 108 so as to reduce the stress placed on the serrations 118.

Figure 5C:
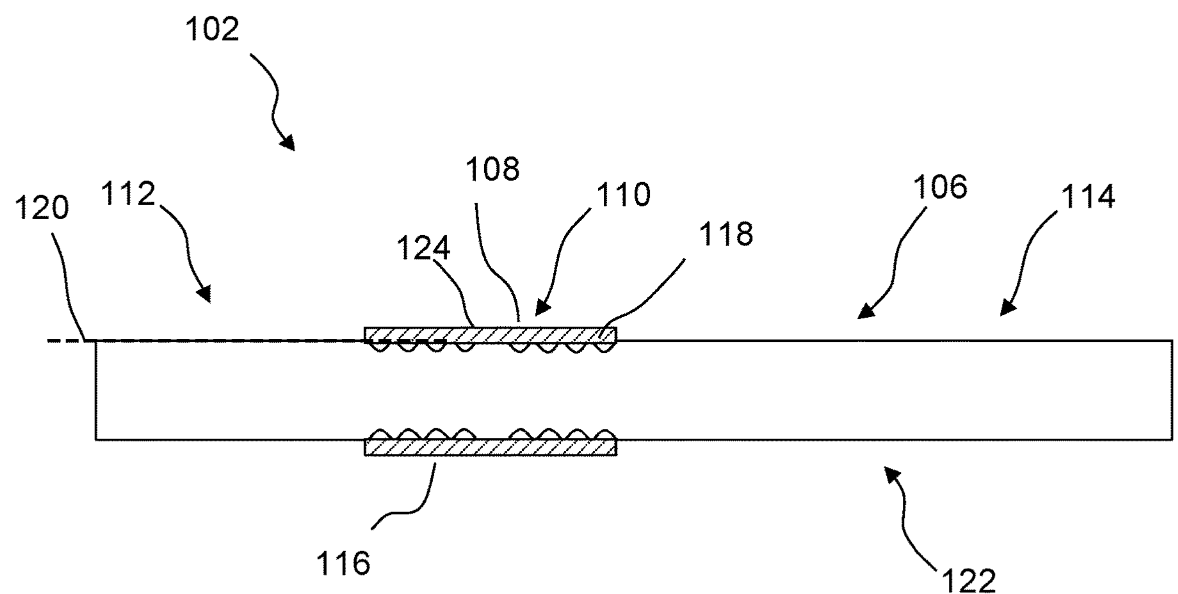

FIG. 5C corresponds to the cross section shown in FIG. 4C, but with the at least one sealing layer 108 shown as overlaying at least part of the serrated region 110. As shown in FIG. 5C, the sealing layer 108 may be substantially proud of the first face 106 in an uncompressed state. That is to say that when the sealing layer 108 is uncompressed, it is located on the other side of the plane 120 to the serrations 118. However, when the sealing layer 108 is compressed, it will at least partially fill the gaps between serrations 118 in the serrated region 110.

Figure 5D:
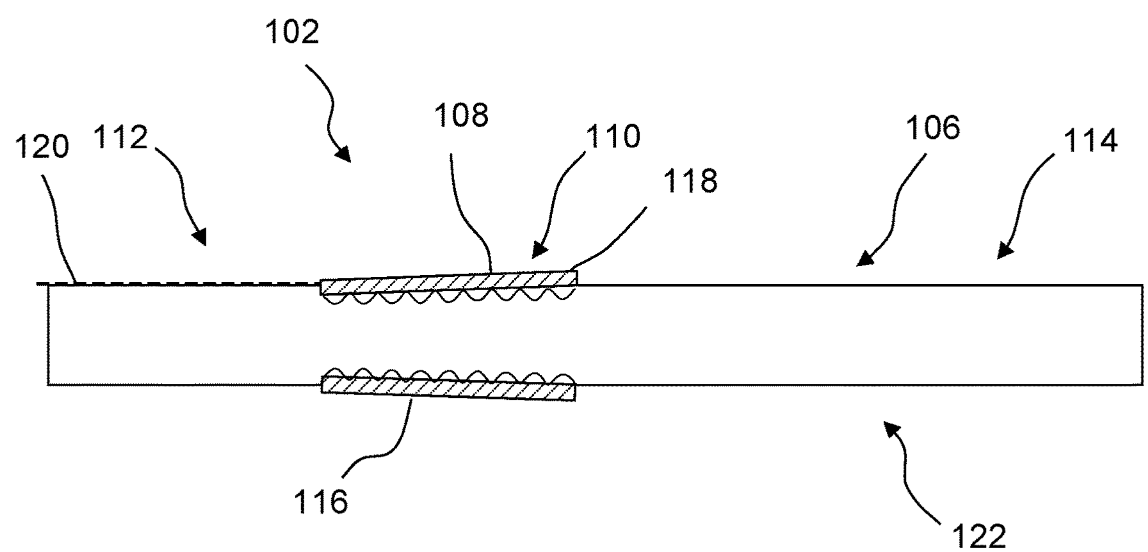

FIG. 5D corresponds to the cross section shown in FIG. 4D, but with the at least one sealing layer 108 shown as overlaying at least part of the serrated region 110. As shown in FIG. 5D, the sealing layer 108 may be sloped relative to the plane 120 defined by the inner face 112.

Figure 5E:
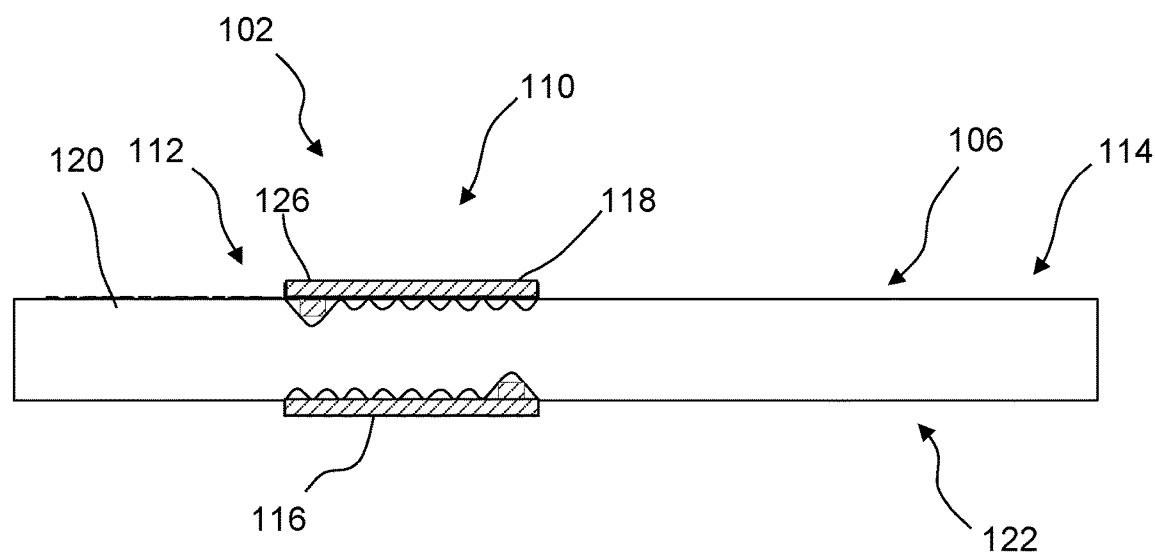

FIG. 5E corresponds to the cross section shown in FIG. 4E, but with the at least one sealing layer 108 shown as overlaying at least part of the serrated region 110. As shown in FIG. 5E, the sealing layer 108 may comprise a projection 126 or additional layer that projects into the deeper trough as defined the first set of serrations.

The example shown in FIG. 4E is substantially identical to the example shown in FIG. 4E except that the plurality of serrations 118 comprises a first set of serrations and a second set of serrations. The first set of serrations are larger than the second set of serrations. In FIG. 4E, one of the serrations comprises a deeper trough compared with the other serrations. In one example, the at least one sealing layer 108 comprises one or more projections configured to be coupled with at least one of the first set of serrations.

Figure 6:
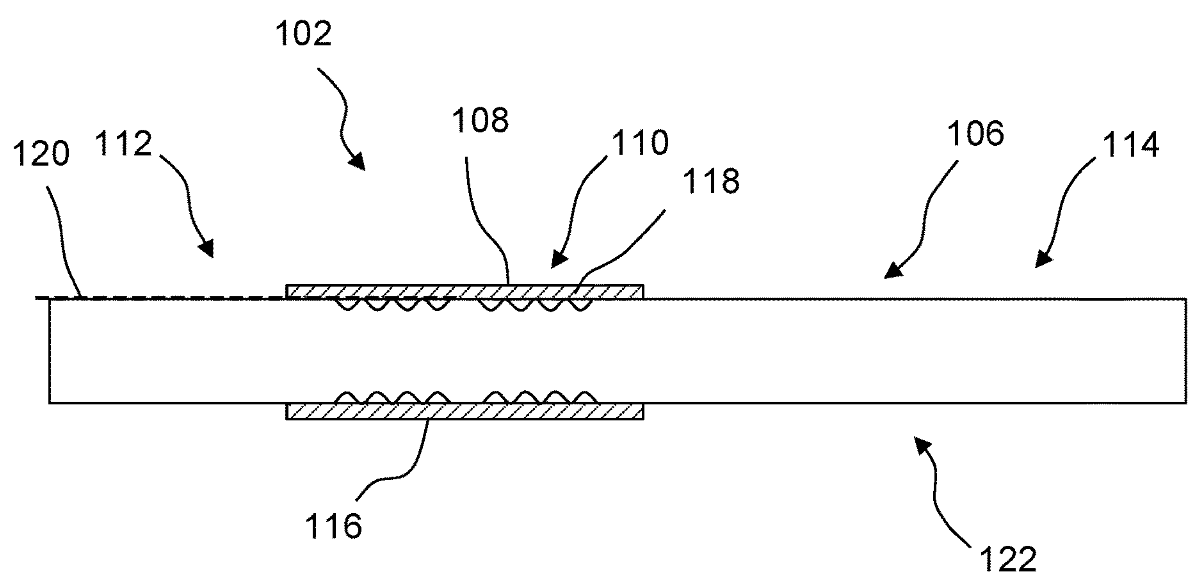
FIG. 6 shows an example of a cross-sectional view through the core.

FIG. 6 corresponds to the cross section shown in FIG. 4C, but with the at least one sealing layer 108 shown as overlaying at least part of the serrated region 110.

As compared with FIG. 5C, the at least one sealing layer 108 shown in FIG. 6 extends beyond the extent of the serrated region 110. In this example, the at least one sealing layer 108 abuts at least part of the inner region 112. In one example, the at least one sealing layer 108 extends past the serrated region 110 such that is abuts at least part of the outer region 114. In examples where the at least one sealing layer 108 abuts at least part of the inner region 112 and/or outer region 114, the abutting area of the inner region 112 and/or outer region 114 provides an important role in both bearing the load and also densifying the sealing layer 108 to higher than usual levels such that it provides a surprisingly good level of sealing. It will be understood that densifying means compressing the sealing layer 108 so that it becomes more dense, relative to the sealing layer in its uncompressed state.

Surprisingly, the use of a non-metal core 102 with a serrated region 110 and an appropriate at least one sealing layer 108, the core 102 was effective at sealing the gasket 100 and capable of withstanding substantially high loads.

Generally, the gaskets of the present invention are ring shaped and typically define a centrally located aperture. However, other shaped gaskets are envisaged. For example, the gasket may have a square, rectangular, oval, elliptical or generally any polygonal cross section.

The gasket of the present invention, whichever the gasket type is, may be required to operate under normal operating pressures between 100 KPa and 43,000 KPa, more typically between 1,000 KPa and 20,000 KPa.

Figure 7:
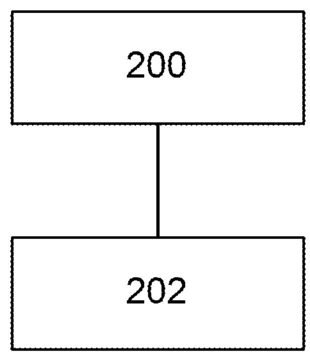
FIG. 7 shows an example of a flow chart of the method steps for producing a gasket

FIG. 7 shows an example of the method steps of producing a gasket 100. Step 200 relates to providing a rigid non-metal core 102 defining an aperture 104, the core 102 comprising a first face 106 extending away from the aperture 104 and a second face opposite the first face 122.

Step 202 relates to forming a serrated region 110 comprising a plurality of serrations 118 in the first face 106 of the core 102. In this example, the first face 106 comprises: a substantially flat inner region 112 defining a plane 120; and the serrated region 110 comprising a plurality of serrations 118, wherein the substantially flat inner region 112 is located between the aperture 104 and the serrated region 110. The serrations 118 are recessed in the first face 106 such that they do not cross the plane 120.

The serrated profile 110 may be machine formed.

The method may include the steps of providing at least one sealing layer 108 and overlaying the at least one sealing layer 108 over at least part of the serrated region 110 of the first face 106.

Preferably, the gasket is a fire-safe gasket.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gasket for sealing two mating surfaces, the gasket comprising:

- a rigid non-metal core defining an aperture, the core comprising a first face extending away from the aperture and a second face extending away from the aperture opposite the first face; and
- at least one sealing layer;
- wherein the first face comprises:
  - a substantially flat inner region defining a plane; and
  - a serrated region comprising a plurality of serrations, wherein the substantially flat inner region is located between the aperture and the serrated region,
- wherein the serrations are recessed within in the core between the plane defined by the substantially flat inner region of the first face and the second face such that they do not cross the plane, and
- wherein the at least one sealing layer overlays at least part of the serrated region of the first face.

2. The gasket according to claim 1, wherein the first face comprises a substantially flat outer region that is aligned on the plane with the inner region, and wherein the serrated region is located between the substantially flat inner region and the substantially flat outer region.

3. The gasket according to claim 2, wherein the serrations terminate prior to the plane so the serrated region defines a channel in the first face of the core.

4. The gasket according to claim 3, wherein the at least one sealing layer is at least partially located within the channel defined by the serrated region.

5. The gasket according to claim 3, wherein the channel is substantially sloped relative to the plane such that the channel decreases in depth from the inner region to the outer region.

6. The gasket according to claim 1, wherein the serrations are configured to extend to the plane.

7. The gasket according to claim 1, wherein the serrated region comprises at least one bridge located between at least one pair of adjacent serrations.

8. The gasket according to claim 7, wherein the bridge comprises a planar portion.

9. The gasket according to claim 8, wherein the planar portion of the at least one bridge is offset with respect to the plane.

10. The gasket according to claim 8, wherein the at least one bridge is aligned on the plane with the inner region.

11. The gasket according to claim 1, wherein the plurality of serrations comprises a first set of serrations and a second set of serrations, wherein the first set of serrations are larger than the second set of serrations.

12. The gasket according to claim 11, wherein the at least one sealing layer comprises one or more projections configured to be coupled with at least one of the first set of serrations.

13. The gasket according to claim 1, wherein the at least one sealing layer is configured to extend past the serrated region to abut at least a portion of the inner region.

14. The gasket according to claim 13, wherein the portion of the at least one sealing layer that abuts the inner region has a relatively higher density compared with the remainder of the sealing layer.

15. The gasket according to claim 1, wherein the non-metal core comprises one or more of:

- glass reinforced epoxy;
- a phenolic resin,
- polytetrafluoroethylene,
- polyimide and/or
- an (alk)acrylic (co)polymer or other suitable (co)polymer.

16. The gasket according to claim 1, wherein the at least one sealing layer comprises polytetrafluoroethylene, layered silicates, a ceramic, graphite or vermiculite.

17. The gasket according to claim 1, wherein the second face comprises:

- a second substantially flat inner region defining a second plane; and
- a second serrated region comprising a second plurality of serrations, wherein the second substantially flat inner region is located between the aperture and the second serrated region,
- wherein the second plurality of serrations are recessed within the core between the first face and the second plane such that they do not cross the second plane, and
- wherein the at least one sealing layer overlays at least part of the second serrated region of the second face.

18. A method of producing a gasket comprising the steps of:

- providing a rigid non-metal core defining an aperture, the core comprising a first face extending away from the aperture and a second face opposite the first face; and
- forming a serrated region comprising a plurality of serrations in the first face of the core such that the first face comprises:
- a substantially flat inner region defining a plane;
- wherein the substantially flat inner region is located between the aperture and the serrated region, and
- wherein the serrations are recessed within the core between the plane and the second face such that they do not cross the plane defined by the substantially flat inner region.

19. The method according to claim 18, wherein the serrated region is machine formed.

20. The method according to claim 18, further comprising the step of providing at least one sealing layer and overlaying the at least one sealing layer over at least part of the serrated region of the first face.

* * * * *